United States Patent
Shinoda (10) Patent No.: US 9,183,376 B2
(45) Date of Patent: Nov. 10, 2015

(54) COMMUNICATION SYSTEM, CLIENT APPARATUS, RELAY APPARATUS, AND COMPUTER-READABLE MEDIUM

(71) Applicant: FUJI XEROX CO., LTD., Minato-ku, Tokyo (JP)

(72) Inventor: Kazumoto Shinoda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 60 days.

(21) Appl. No.: 13/874,011

(22) Filed: Apr. 30, 2013

(65) Prior Publication Data

US 2014/0101725 A1   Apr. 10, 2014

(30) Foreign Application Priority Data

Oct. 5, 2012 (JP) ................................. 2012-223173

(51) Int. Cl.
*G06F 17/00* (2006.01)
*G06F 21/44* (2013.01)
*G06F 21/41* (2013.01)

(52) U.S. Cl.
CPC ................ *G06F 21/44* (2013.01); *G06F 21/41* (2013.01)

(58) Field of Classification Search
USPC ............................ 726/2, 3, 4, 9; 709/225, 242
See application file for complete search history.

(56) References Cited

U.S. PATENT DOCUMENTS

| | | | |
|---|---|---|---|
| 2005/0138362 A1* | 6/2005 | Kelly et al. | 713/156 |
| 2007/0025342 A1* | 2/2007 | Obata | 370/352 |
| 2009/0094684 A1* | 4/2009 | Chinnusamy et al. | 726/4 |
| 2009/0222900 A1* | 9/2009 | Benaloh et al. | 726/9 |
| 2010/0031313 A1* | 2/2010 | Noguchi | 726/2 |
| 2010/0062787 A1* | 3/2010 | Yoshiuchi et al. | 455/452.2 |
| 2010/0271650 A1* | 10/2010 | Tomizawa et al. | 358/1.13 |
| 2011/0191474 A1* | 8/2011 | Fiatal | 709/225 |
| 2011/0271009 A1* | 11/2011 | Doshi et al. | 709/242 |
| 2012/0086978 A1* | 4/2012 | Uchikawa | 358/1.15 |
| 2012/0113464 A1* | 5/2012 | Inoue et al. | 358/1.15 |
| 2012/0117199 A1* | 5/2012 | Nagasaki et al. | 709/219 |
| 2012/0117629 A1* | 5/2012 | Miyazawa et al. | 726/4 |
| 2012/0198521 A1* | 8/2012 | Urakawa | 726/4 |
| 2014/0007199 A1* | 1/2014 | Ishino | 726/4 |

FOREIGN PATENT DOCUMENTS

| | | |
|---|---|---|
| JP | 2012-083845 A | 4/2012 |
| JP | 2012113696 A | 6/2012 |

OTHER PUBLICATIONS

Office Action issued by the Japanese Patent Office in corresponding Japanese Patent Application No. 2012223173, dated Dec. 3, 2013.

* cited by examiner

*Primary Examiner* — Joseph P Hirl
*Assistant Examiner* — Sayed Beheshti Shirazi
(74) *Attorney, Agent, or Firm* — Sughrue Mion, PLLC (57) ABSTRACT

A communication system includes a client apparatus and a relay apparatus. The client apparatus includes an acquisition unit and a request unit. The acquisition unit acquires permission information indicating permission to access a service provider apparatus, from the service provider apparatus. The request unit transmits the permission information and user identification information which has been input, to the relay apparatus so as to request access to the service provider apparatus. The relay apparatus includes a storage controller and an access unit. The storage controller stores the permission information and the user identification information which are received from the client apparatus, in a storage unit in such a manner that the permission information and the user identification information are associated with each other. The access unit accesses the service provider apparatus by using the permission information stored in the storage unit.

6 Claims, 6 Drawing Sheets

| USER NAME | PASSWORD | ACCESS TOKEN | | |
|---|---|---|---|---|
| | | service-a | service-b | service-c |
| userA | xxxx | AAA | ... | ... |
| userB | xxxx | BBB | ... | ... |
| ... | ... | ... | ... | ... |

FIG. 12

COMMUNICATION SYSTEM, CLIENT APPARATUS, RELAY APPARATUS, AND COMPUTER-READABLE MEDIUM

CROSS-REFERENCE TO RELATED APPLICATIONS

This application is based on and claims priority under 35 USC 119 from Japanese Patent Application No. 2012-223173 filed Oct. 5, 2012.

BACKGROUND (i) Technical Field

The present invention relates to a communication system, a client apparatus, a relay apparatus, and a computer-readable medium.

(ii) Related Art

A type of service which is called a cloud service or cloud computing is known. In this type of service, for example, a server on a network instead of an image forming apparatus performs various types of information processing, such as storage of data and conversion of data format.

SUMMARY

According to an aspect of the prevent invention, there is provided a communication system including a client apparatus and a relay apparatus. The client apparatus includes an acquisition unit and a request unit. The acquisition unit acquires permission information indicating permission to access a service provider apparatus, from the service provider apparatus. The request unit transmits the permission information acquired by the acquisition unit and user identification information which has been input, to the relay apparatus so as to request access to the service provider apparatus. The relay apparatus includes a storage controller and an access unit. The storage controller stores the permission information and the user identification information which are received from the client apparatus, in a storage unit in such a manner that the permission information and the user identification information are associated with each other. The access unit accesses the service provider apparatus by using the permission information stored in the storage unit.

BRIEF DESCRIPTION OF THE DRAWINGS

Exemplary embodiments of the present invention will be described in detail based on the following figures, wherein.

DETAILED DESCRIPTION

Configuration

Figure 1:
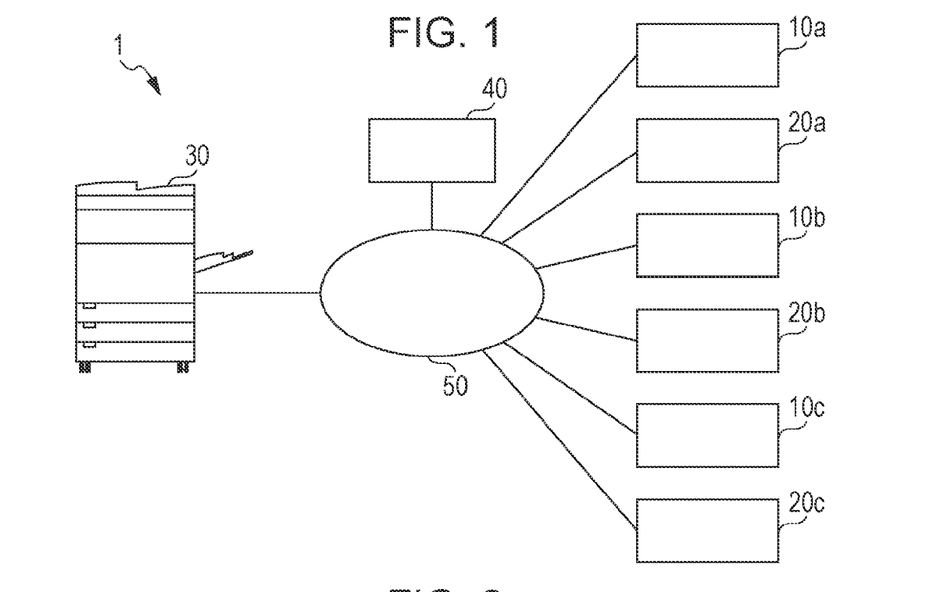
FIG. 1 is a block diagram illustrating the overall configuration of a communication system.

FIG. 1 is a block diagram illustrating the overall configuration of a communication system 1 according to an exemplary embodiment of the present invention. The communication system 1 includes cloud-service provider apparatuses 10a, 10b, and 10C, token issuing apparatuses 20a, 20b, and 20c, an image processing apparatus 30, and a relay apparatus 40.

The cloud-service provider apparatuses 10a, 10b, and 10c provide a so-called cloud service. The cloud service herein is provided by a server on a network by performing various types of information processing, such as storage and provision of data. The token issuing apparatuses 20a, 20b, and 20c manage the login and the connection to the cloud-service provider apparatuses 10a, 10b, and 10c, respectively. The image processing apparatus 30 receives service provided by the cloud-service provider apparatuses 10a, 10b, and 10c. In the exemplary embodiment, the image processing apparatus 30 has a print function and a scanner function. A network 50 connects the image processing apparatus 30, the relay apparatus 40, the cloud-service provider apparatuses 10a, 10b, and 10c, and the token issuing apparatuses 20a, 20b, and 20c to each other, and is, for example, the Internet.

When the cloud-service provider apparatuses 10a, 10b, and 10c provide a service for the image processing apparatus 30, the relay apparatus 40 relays data which is transmitted between the cloud-service provider apparatuses 10a, 10b, and 10c and the image processing apparatus 30. More specifically, receiving, for example, data which is to be stored from the image processing apparatus 30, the relay apparatus 40 transfers the data to one of the cloud-service provider apparatuses 10a, 10b, and 10c or to more than one cloud-service provider apparatus. Receiving data to be printed from one of the cloud-service provider apparatuses 10a, 10b, and 10c, the relay apparatus 40 transfers the data to the image processing apparatus 30. In a process of data reception/transmission between the cloud-service provider apparatuses 10a, 10b, and 10c and the image processing apparatus 30, the relay apparatus 40 may invoke a service other than the reception/transmission, e.g., data processing, such as a character recognition service which is called optical character recognition (OCR) or a service for converting the data format.

One of mechanisms for authentication in this type of data relay is so-called single sign-on. In single sign-on, for example, the relay apparatus 40 stores user IDs (identification data) and passwords which are pieces of authentication information registered in each of the cloud-service provider apparatuses 10a, 10b, and 10c, in such a manner that a user ID and a password are associated with each other, and the relay apparatus 40 is responsible for login to the cloud service provided by each of the cloud-service provider apparatuses. However, in this mechanism, the relay apparatus 40 stores personal information which is user IDs and passwords which serve as authentication information. Therefore, it is undeniable that there is a risk of leaking this personal information to a third party. Accordingly, without storing user IDs and passwords registered in the cloud-service provider apparatuses 10a, 10b, and 10c, the relay apparatus 40 relays data from the image processing apparatus 30 to the cloud-service provider apparatuses 10a, 10b, and 10c.

Since having a similar hardware configuration and similar operations, the cloud-service provider apparatuses 10a, 10b, and 10c are hereinafter called a cloud-service provider apparatus 10 when distinction therebetween is not needed. Similarly, since having a similar hardware configuration and similar operations, the token issuing apparatuses 20a, 20b, and 20c are hereinafter called a token issuing apparatus 20 when distinction therebetween is not needed.

Figure 2:
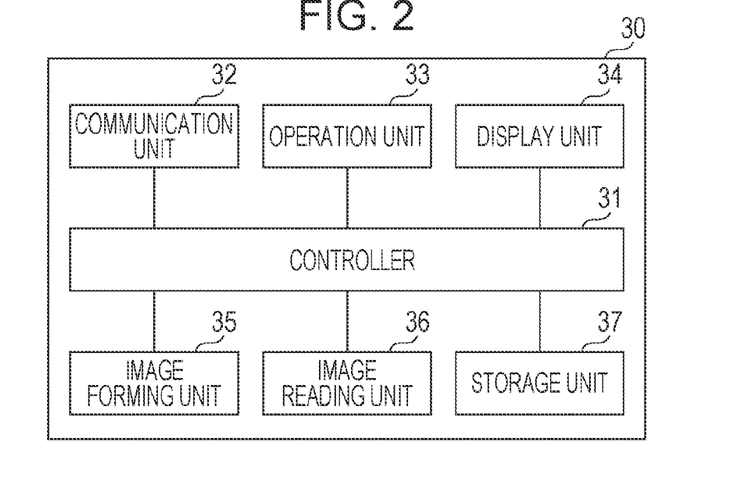
FIG. 2 is a diagram illustrating the hardware configuration of an image processing apparatus.

FIG. 2 is a diagram illustrating the hardware configuration of the image processing apparatus 30. The image processing apparatus 30 includes a controller 31, a communication unit 32, an operation unit 33, a display unit 34, an image forming unit 35, an image reading unit 36, and a storage unit 37. The controller 31 includes an arithmetic and logic unit such as a central processing unit (CPU), and main storage units, such as a read only memory (ROM) and a random access memory (RAM). The ROM stores programs executed by a CPU. The CPU uses the RAM as a work area to execute programs stored in the ROM or the storage unit 37, thereby controlling operations of the units in the image processing apparatus 30. The communication unit 32 communicates with the relay apparatus 40 and the token issuing apparatuses 20 via the network 50. The operation unit 33 includes operators, such as various keys and a touch sensor, and supplies an operation signal which corresponds to an operation from a user, to the controller 31. The controller 31 performs a process corresponding to the operation signal. The display unit 34 includes a liquid crystal panel and a liquid-crystal driving circuit, and displays an image under the control of the controller 31. The image forming unit 35 forms an image by using an electrophotographic system. The image reading unit 36 reads out a document image in an optical manner. The storage unit 37 is a large-capacity storage such as a hard disk, and stores data and programs used by the controller 31.

Figure 3:
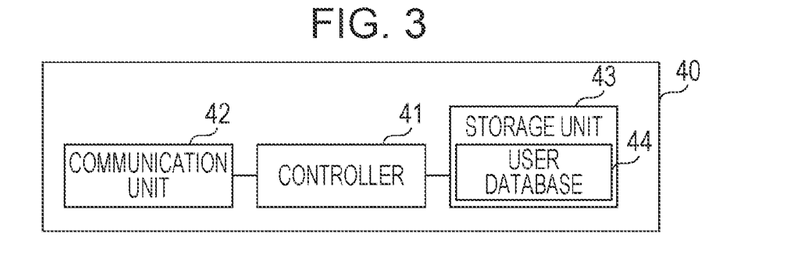
FIG. 3 is a diagram illustrating the hardware configuration of a relay apparatus.

FIG. 3 is a diagram illustrating the hardware configuration of the relay apparatus 40. The relay apparatus 40 is constituted by a computer including a controller 41, a communication unit 42, and a storage unit 43. The controller 41 includes an arithmetic and logic unit such as a CPU, and main storage units, such as a ROM and a RAM. The CPU uses the RAM as a work area to execute programs stored in the ROM or the storage unit 43, thereby controlling operations of the units in the relay apparatus 40. The communication unit 42 communicates with the image processing apparatus 30 and the cloud-service provider apparatuses 10 via the network 50. The storage unit 43 is a large-capacity nonvolatile storage such as a hard disk, and stores data and programs used by the controller 41. The storage unit 43 stores a user database 44.

Figure 4:
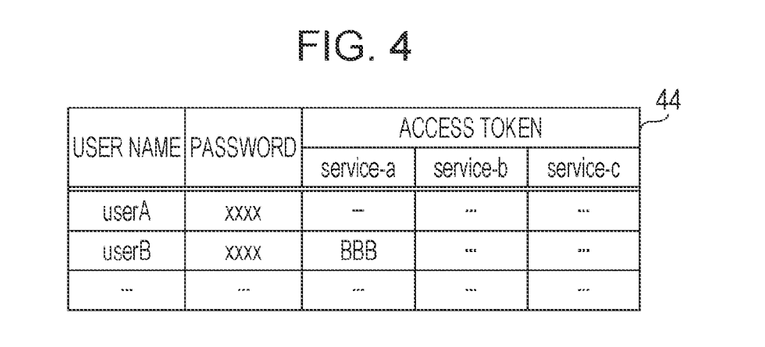
FIG. 4 is a diagram illustrating a user database.

FIG. 4 is a diagram illustrating the user database 44. The user database 44 stores user names and passwords for identifying users of the image processing apparatus 30, service names for identifying the cloud-service provider apparatuses 10, and access tokens for the cloud-service provider apparatuses 10 in such a manner that the user names and the passwords, the service names, and the access tokens are associated with each other. An access token is information indicating permission to access a cloud-service provider apparatus 10. For example, an access token includes account information and information indicating access permission.

Figure 5:
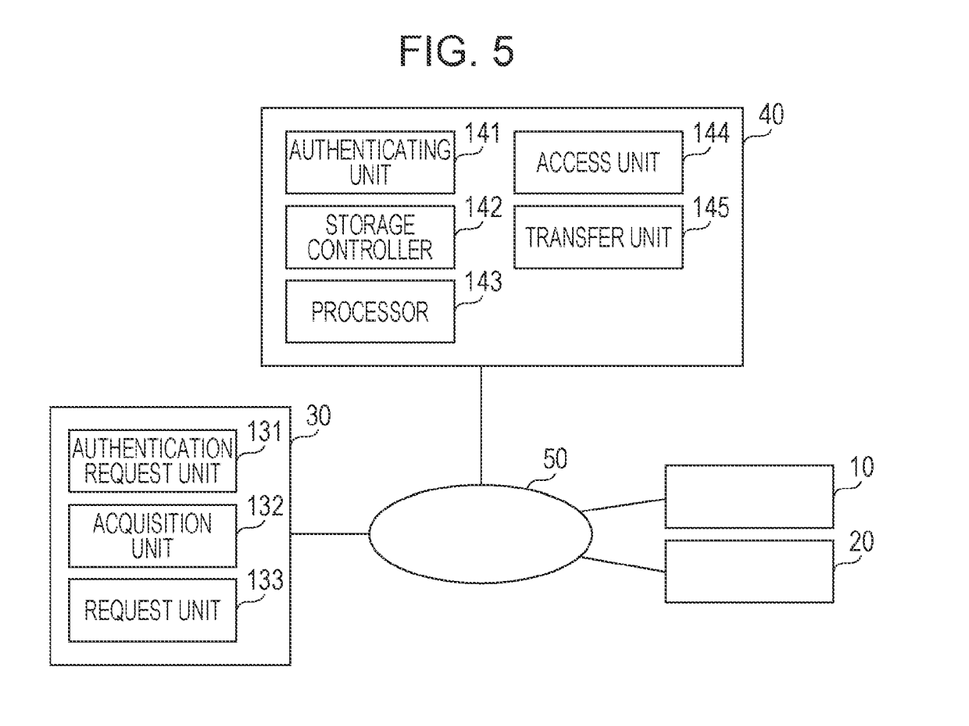
FIG. 5 is a diagram illustrating the functional configuration of a communication system.

FIG. 5 is a diagram illustrating the functional configuration of the communication system 1. The image processing apparatus 30 achieves functions of an authentication request unit 131, an acquisition unit 132, and a request unit 133 by using the controller 31 or by using the controller 31 and the communication unit 32. The authentication request unit 131 transmits a user name and a password which are input by a user to the relay apparatus 40, and requests user authentication based on the user name and the password. The acquisition unit 132 acquires an access token indicating that the image processing apparatus 30 has permission to access a cloud-service provider apparatus 10, from the cloud-service provider apparatus 10. The request unit 133 transmits the access token acquired from the acquisition unit 132 and the user name acquired from the authentication request unit 131 to the relay apparatus 40 so as to request access to the cloud-service provider apparatus 10. For example, when image data is to be stored in a cloud-service provider apparatus 10, the request unit 133 transmits the image data to be stored to the relay apparatus 40. When document data stored in a cloud-service provider apparatus 10 is to be printed, the request unit 133 transmits the document ID for identifying document data to be printed to the relay apparatus 40.

The relay apparatus 40 achieves functions of an authenticating unit 141, a storage controller 142, a processor 143, an access unit 144, and a transfer unit 145 by using the controller 41 or by using the controller 41 and the communication unit 42. In response to the request from the authentication request unit 131, the authenticating unit 141 performs user authentication based on the user name and the password received from the image processing apparatus 30. The storage controller 142 stores the user name and the access token received from the image processing apparatus 30 in the storage unit 43 in such a manner that the user name and the access token are associated with each other. The processor 143 subjects data received from the image processing apparatus 30 or a cloud-service provider apparatus 10 to various types of image processing. For example, the processor 143 subjects image data received from the image processing apparatus 30 to OCR. The processor 143 converts document data received from a cloud-service provider apparatus 10 into a format in which the image processing apparatus 30 is capable to printing the document data. The access unit 144 accesses a cloud-service provider apparatus 10 by using an access token stored in the storage unit 43. For example, when image data is to be stored in a cloud-service provider apparatus 10, the access unit 144 accesses the cloud-service provider apparatus 10 to request storage of the image data received from the image processing apparatus 30. When document data stored in a cloud-service provider apparatus 10 is to be printed, the access unit 144 accesses the cloud-service provider apparatus 10 to acquire the document data identified with a document ID received from the image processing apparatus 30. The transfer unit 145 transfers the data acquired by the access unit 144 to the image processing apparatus 30.

Operations

Data Storage Process

Operations according to the exemplary embodiment will be described. With reference to the sequence charts illustrated in FIGS. 6 and 7, a process will be described in which image data acquired through scanning in the image processing apparatus 30 is stored in the cloud-service provider apparatus 10a.

Figure 8:
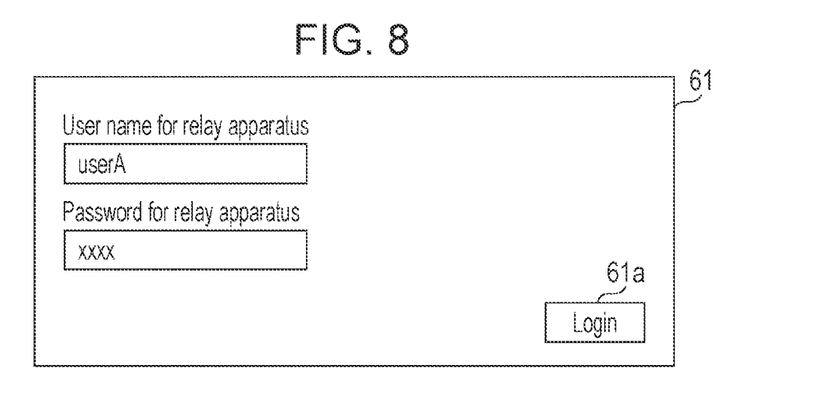
FIG. 8 is a diagram illustrating a login screen for logging into a relay apparatus.

A user A operates the operation unit 33 so as to display a login screen 61 for logging into the relay apparatus 40 on the display unit 34. FIG. 8 is a diagram illustrating the login screen 61. When the login screen 61 is displayed, the user A operates the operation unit 33 so as to input his/her user name "userA" and a password "xxxx" registered in the relay apparatus 40 and press a login button 61a. The authentication request unit 131 acquires the user name and the password which are input in the login screen 61. The authentication request unit 131 requests the relay apparatus 40 to perform user authentication based on the user name and the password which are acquired. Specifically, the authentication request unit 131 transmits an authentication request including the user name and the password which are acquired to the relay apparatus 40 (in step S11 in FIG. 6).

Figure 6:
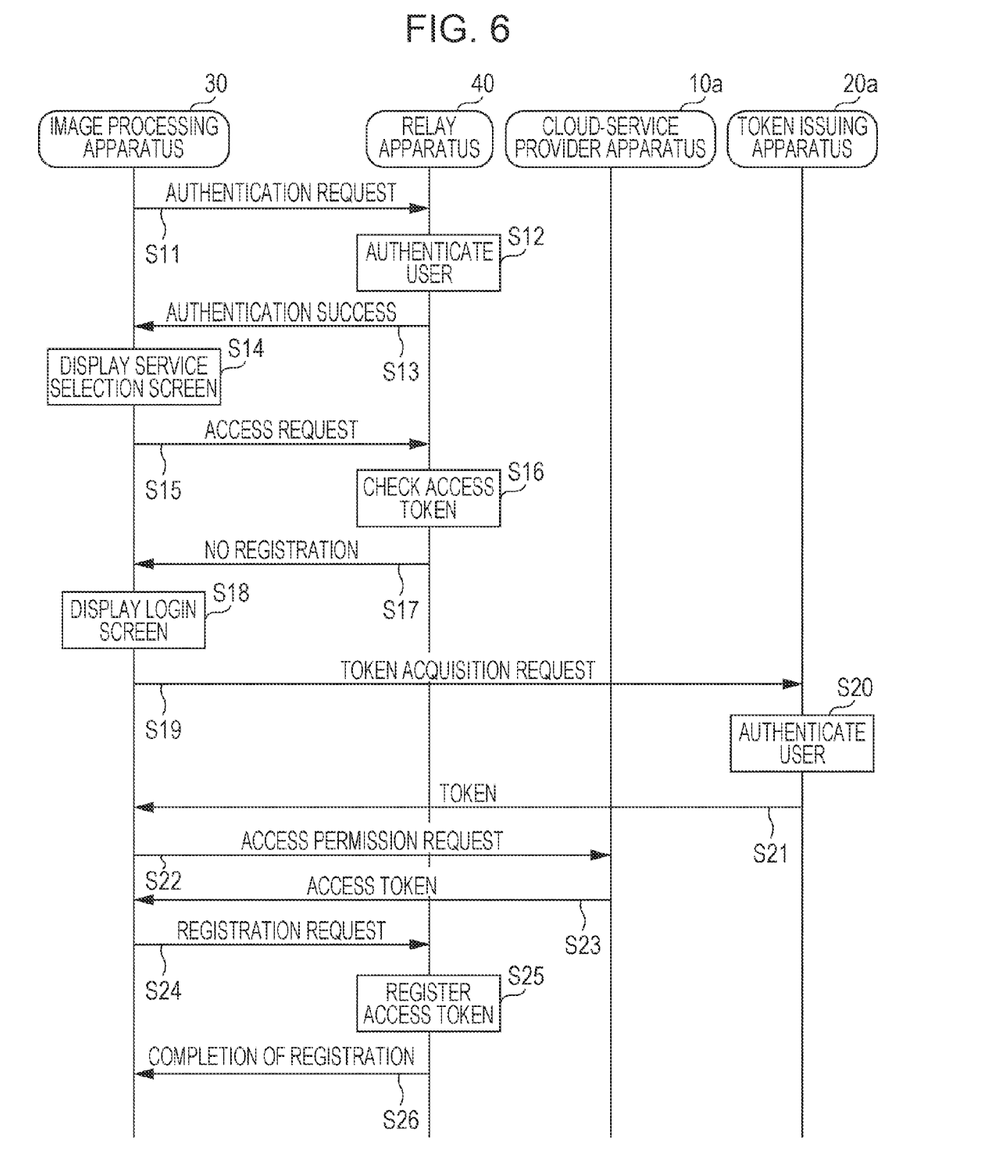
FIG. 6 is a sequence chart of a process of performing authentication.

Receiving the authentication request from the image processing apparatus 30, the authenticating unit 141 of the relay apparatus 40 performs user authentication by determining whether or not the user name and the password included in the authentication request are included in the user database 44 (in step S12). The user database 44 illustrated in FIG. 4 stores the user name "userA" and the password "xxxx". In this case, the authenticating unit 141 transmits a notification indicating authentication success to the image processing apparatus 30 (in step S13).

Figure 9:
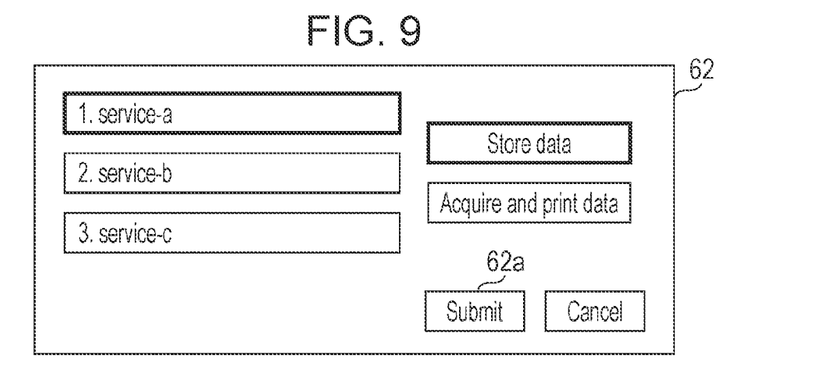
FIG. 9 is a diagram illustrating a service selection screen.

Receiving a notification indicating authentication success from the relay apparatus 40, the request unit 133 of the image processing apparatus 30 displays a service selection screen 62 for selecting a service provided by a cloud-service provider apparatus 10 on the display unit 34 (in step S14). FIG. 9 is a diagram illustrating the service selection screen 62. In this step, to store image data in the cloud-service provider apparatus 10a, the user A operates the operation unit 33 so as to select the buttons "1. Service-a" and "Store data" and press a submit button 62a.

When the submit button 62a is pressed, the request unit 133 requests the relay apparatus 40 to access the cloud-service provider apparatus 10a. Specifically, the request unit 133 transmits an access request including the service name "service-a" for the cloud-service provider apparatus 10a which is selected in the service selection screen 62 and the user name "userA" acquired by the authentication request unit 131, to the relay apparatus 40 (in step S15).

Receiving the access request from the image processing apparatus 30, the access unit 144 of the relay apparatus 40 refers to the user database 44, and checks if an access token which corresponds to the user A and which is necessary to access the cloud-service provider apparatus 10a is registered (in step S16). In the user database 44 illustrated in FIG. 4, an access token corresponding to the user name "userA" and the service name "service-a" included in the access request is not stored. In this case, the access unit 144 transmits a notification indicating that an access token is not registered, to the image processing apparatus 30 (in step S17).

Receiving this notification from the image processing apparatus 30, the acquisition unit 132 of the image processing apparatus 30 acquires an access token which corresponds to the user A and which is necessary to access the cloud-service provider apparatus 10a, from the cloud-service provider apparatus 10a. Specifically, the acquisition unit 132 first displays a login screen 63 for logging into the cloud-service provider apparatus 10a (in step S18).

Figure 10:
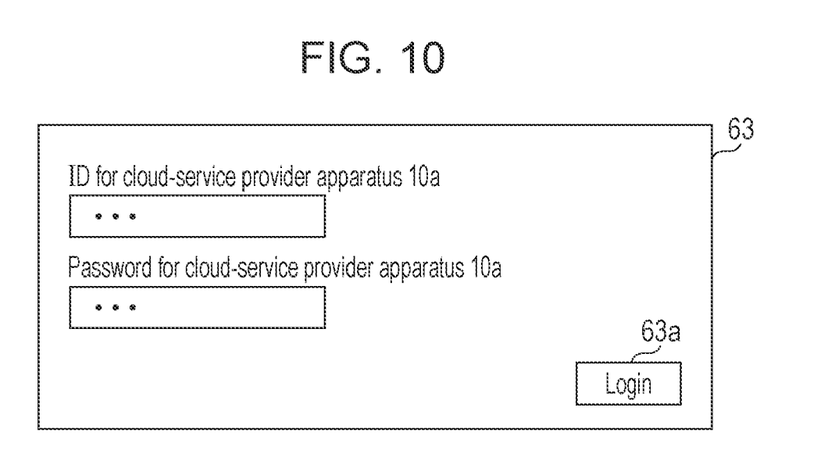
FIG. 10 is a diagram illustrating a login screen for logging into a cloud-service provider apparatus.

FIG. 10 is a diagram illustrating the login screen 63. When the login screen 63 is displayed, the user A operates the operation unit 33 so as to input his/her own ID and password which are registered in the cloud-service provider apparatus 10a and press a login button 63a. This ID and this password are different from the user name and the password registered in the relay apparatus 40. When the login button 63a is pressed, the acquisition unit 132 transmits a token acquisition request including the ID and the password which have been input in the login screen 63, to the token issuing apparatus 20a (in step S19).

Receiving the token acquisition request from the image processing apparatus 30, the token issuing apparatus 20a performs user authentication by determining whether or not the ID and the password included in the token acquisition request have been registered in advance (in step S20). When the authentication succeeds, the token issuing apparatus 20a issues a token corresponding to the user A, and transmits the token to the image processing apparatus 30 (in step S21). The image processing apparatus 30 stores the received token in the storage unit 37 in such a manner that the token is associated with the access request which includes the service name "service-a" for the cloud-service provider apparatus 10a and the user name "userA" acquired by the authentication request unit 131 and which has been submitted in step S15. This token indicates that the user A is authenticated, that is, is information indicating that the user A is certified. The token is signed by the token issuing apparatus 20a to certify that the token issuing apparatus 20a issues the token. The cloud-service provider apparatus 10a and the token issuing apparatus 20a rely on each other. When an access request is submitted with a token issued by the token issuing apparatus 20a, the cloud-service provider apparatus 10a allows the access.

After the token received from the token issuing apparatus 20a is stored, the acquisition unit 132 of the image processing apparatus 30 uses the token to access the cloud-service provider apparatus 10a, and acquires an access token corresponding to the user A from the cloud-service provider apparatus 10a. Specifically, the acquisition unit 132 transmits an access permission request including the token received from the token issuing apparatus 20a to the cloud-service provider apparatus 10a (in step S22). Receiving the access permission request from the image processing apparatus 30, since the access permission request includes the token issued by the token issuing apparatus 20a, the cloud-service provider apparatus 10a transmits an access token "AAA" corresponding to the user A to the image processing apparatus 30 (in step S23) in order to allow access from the user A. Receiving the access token from the cloud-service provider apparatus 10a, the acquisition unit 132 of the image processing apparatus 30 acquires the access token, and stores the access token in the storage unit 37 in such a manner that the access token is associated with the access request which includes the service name "service-a" for the cloud-service provider apparatus 10a and the user name "userA" acquired by the authentication request unit 131 and which has been submitted in step S15.

After the acquisition unit 132 acquires the access token, the request unit 133 requests the relay apparatus 40 to register the access token. Specifically, the request unit 133 transmits a registration request including the user name "userA" acquired by the authentication request unit 131, the service name "service-a" for the cloud-service provider apparatus 10a selected in the service selection screen 62, and the access token "AAA" acquired by the acquisition unit 132, to the relay apparatus 40 (in step S24).

Figure 11:
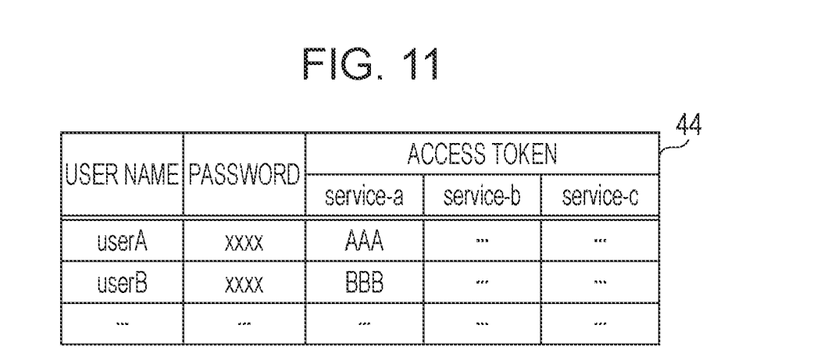
FIG. 11 is a diagram illustrating a user database after registration of data.

Receiving the request to register the access token, the storage controller 142 of the relay apparatus 40 registers the access token in the user database 44 in accordance with the registration request (in step S25). FIG. 11 is a diagram illustrating the user database 44 after the registration. As illustrated in FIG. 11, the storage controller 142 stores the access token "AAA" included in the registration request in the user database 44 in such a manner that the access token "AAA" is associated with the user name "userA" and the service name "service-a" included in the registration request.

After registration of the access token is completed, the storage controller 142 transmits a notification that the access token has been registered, to the image processing apparatus 30 (in step S26). By performing the above-described processes, the relay apparatus 40 stores the permission for the user A to access the cloud-service provider apparatus 10a.

Receiving the notification that the access token has been registered from the relay apparatus 40, the request unit 133 of the image processing apparatus 30 requests the relay apparatus 40 to access the cloud-service provider apparatus 10a.

Figure 7:
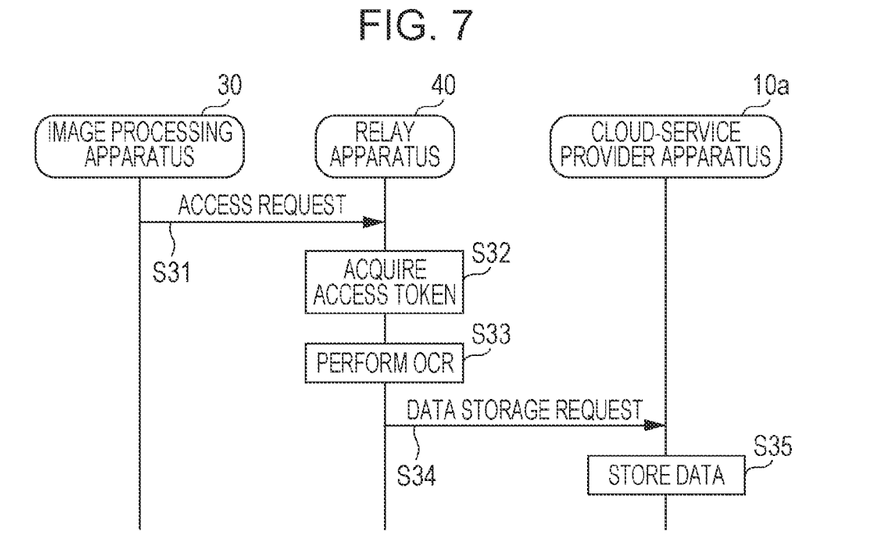
FIG. 7 is a sequence chart of a process of storing data in a cloud-service provider apparatus.

Specifically, the request unit 133 transmits an access request including the user name "userA" acquired by the authentication request unit 131, the service name "service-a" for the cloud-service provider apparatus 10a selected in the service selection screen 62, and image data to be stored in the cloud-service provider apparatus 10a, to the relay apparatus 40 (in step S31 in FIG. 7). The image data is generated by reading out an image of a document by using the image reading unit 36, for example, through an operation of the user A.

Receiving the access request from the image processing apparatus 30, the access unit 144 of the relay apparatus 40 reads out and acquires an access token which corresponds to the user A and which is necessary to access the cloud-service provider apparatus 10a from the user database 44 (in step S32). The user database 44 illustrated in FIG. 11 stores the access token "AAA" which is associated with the user name "userA" and the service name "service-a" included in the access request. In this case, the access unit 144 reads out and acquires the access token "AAA" from the user database 44. The processor 143 performs OCR on the image data included in the access request (in step S33).

The access unit 144 uses the access token acquired from the user database 44 to access the cloud-service provider apparatus 10a and request storage of the data which has been subjected to OCR. Specifically, the access unit 144 acquires the data which has been subjected to OCR, from the processor 143, and transmits a data storage request including the access token acquired from the user database 44 and the data acquired from the processor 143, to the cloud-service provider apparatus 10a (in step S34). The data storage request includes the access token corresponding to the cloud-service provider apparatus 10a. Therefore, the cloud-service provider apparatus 10a accepts the access from the relay apparatus 40. Receiving the data storage request from the relay apparatus 40, the cloud-service provider apparatus 10a stores the image data included in the data storage request in a storage unit (in step S35).

Print Process

Figure 12:
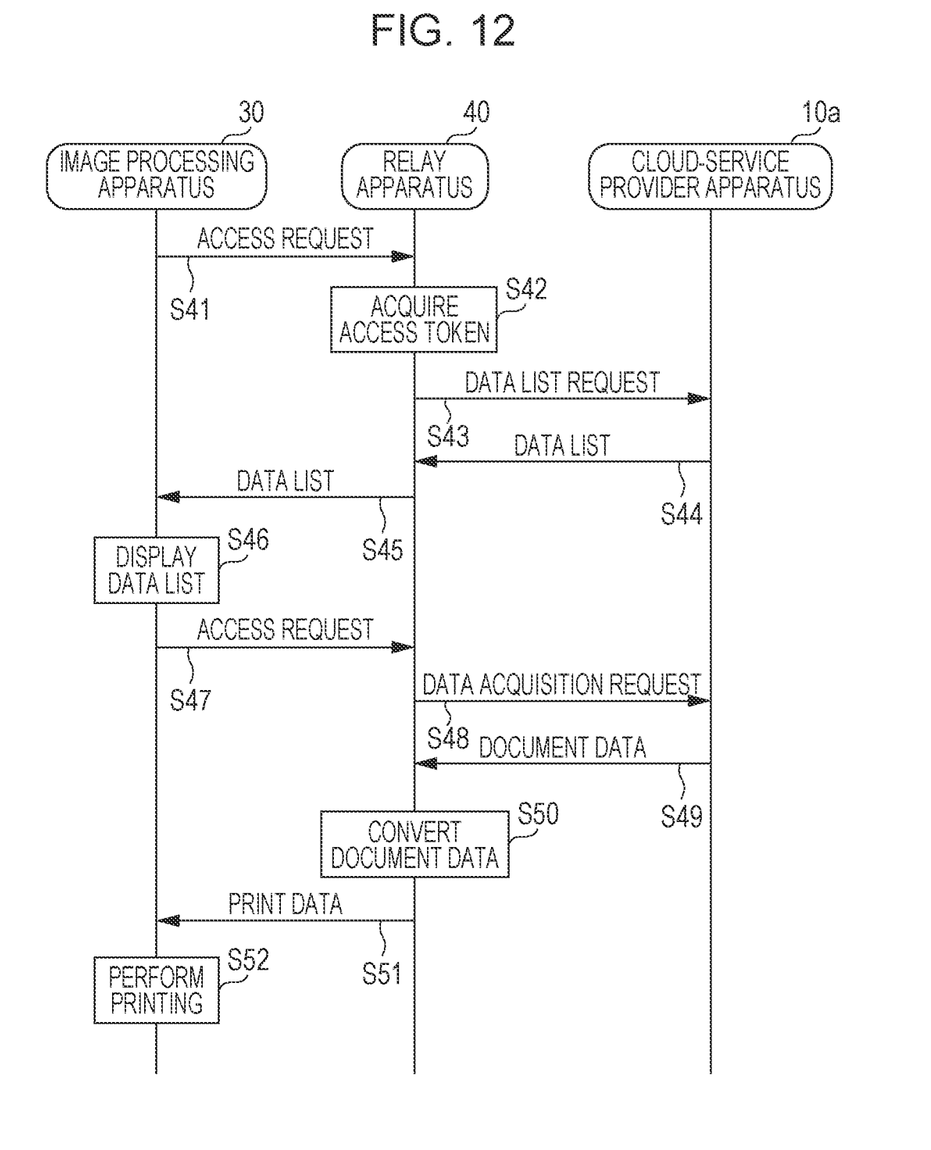
FIG. 12 is a sequence chart of a process of printing document data stored in a cloud-service provider apparatus.

With reference to the sequence chart illustrated in FIG. 12, a process of printing document data stored in the cloud-service provider apparatus 10a will be described. Steps S11 to S26 illustrated in FIG. 6 are basically the same as those in the data storage process described above, and will not be described. However, in this process, to acquire and print document data stored in the cloud-service provider apparatus 10a, when the service selection screen 62 illustrated in FIG. 9 is displayed in step S14, the user A operates the operation unit 33 so as to select the buttons "1. Service-a" and "Acquire and print data" and to press the submit button 62a.

As described above, the processes in steps S11 to S26 illustrated in FIG. 6 cause the relay apparatus 40 to store access permission for the user A to access the cloud-service provider apparatus 10a. After the relay apparatus 40 stores the access permission, the request unit 133 of the image processing apparatus 30 requests the relay apparatus 40 to access the cloud-service provider apparatus 10a so as to acquire list information of data stored in the cloud-service provider apparatus 10a. Specifically, the request unit 133 transmits an access request including the user name "userA" acquired by the authentication request unit 131 and the service name "service-a" for the cloud-service provider apparatus 10a selected in the service selection screen 62 to the relay apparatus 40 (in step S41 in FIG. 12). Receiving the access request from the image processing apparatus 30, the access unit 144 of the relay apparatus 40 acquires an access token from the user database 44 as in step S32 illustrated in FIG. 7 (in step S42). The access unit 144 transmits a data list request including the access token acquired from the user database 44 and the user name "userA" included in the access request, to the cloud-service provider apparatus 10a (in step S43).

The data list request includes the access token for the cloud-service provider apparatus 10a. Therefore, the cloud-service provider apparatus 10a accepts the access from the relay apparatus 40. Receiving the data list request from the relay apparatus 40, the cloud-service provider apparatus 10a transmits list information of data which may be acquired by the user A who corresponds to the user name included in the data list request, to the relay apparatus 40 (in step S44). The document data may be document data stored in the cloud-service provider apparatus 10a, or may be document data generated on the basis of resulting data acquired through a process performed by the cloud-service provider apparatus 10a. Alternatively, the document data may be reference information to document data stored in other cloud-service provider apparatuses 10 or a document management apparatus (not illustrated).

Receiving the data list information from the cloud-service provider apparatus 10a, the transfer unit 145 of the relay apparatus 40 transfers the data list information to the image processing apparatus 30 (in step S45). Receiving the data list information from the relay apparatus 40, the request unit 133 of the image processing apparatus 30 displays the data list information on the display unit 34 (in step S46). When the list of document data is displayed, the user A operates the operation unit 33 so as to select a piece of document data to be printed, and to press a start button. Upon pressing of the start button, the request unit 133 of the image processing apparatus 30 requests the relay apparatus 40 to access the cloud-service provider apparatus 10a in order to acquire the piece of document data. Specifically, the request unit 133 transmits an access request including the user name "userA" acquired by the authentication request unit 131, the service name "service-a" for the cloud-service provider apparatus 10a selected in the service selection screen 62, and the document ID for identifying the piece of document data selected from the list of document data, to the relay apparatus 40 (in step S47).

Receiving the access request from the image processing apparatus 30, the access unit 144 of the relay apparatus 40 uses the access token acquired from the user database 44 to access the cloud-service provider apparatus 10a and acquire document data corresponding to the document ID included in the access request, from the cloud-service provider apparatus 10a. Specifically, the access unit 144 transmits a data acquisition request including the access token acquired from the user database 44 and the document ID included in the access request, to the cloud-service provider apparatus 10a (in step S48). The data acquisition request includes the access token corresponding to the cloud-service provider apparatus 10a. Therefore, the cloud-service provider apparatus 10a accepts the access from the relay apparatus 40. Receiving the data acquisition request from the relay apparatus 40, the cloud-service provider apparatus 10a reads out document data identified with the document ID included in the data acquisition request, from the storage unit, and transmits the document data to the relay apparatus 40 (in step S49). Receiving the document data from the cloud-service provider apparatus 10a, the processor 143 of the relay apparatus 40 converts the document data into print data having a format in which the image processing apparatus 30 is capable of printing a document (in step S50). The transfer unit 145 transmits the print data to the image processing apparatus 30 (in step S51). Receiving the print data from the relay apparatus 40, the image processing apparatus 30 prints the print data by using the image forming unit 35 (in step S52).

As illustrated in the above-described exemplary embodiment, there is a type of cloud-service provider apparatus 10 which, when a token is issued from a token issuing apparatus 20 in accordance with a request from an image processing apparatus 30, does not allow an access token to be transmitted to apparatuses other than the image processing apparatus 30, e.g., the relay apparatus 40. According to the exemplary embodiment, even when it is not allowed that access permission to access a cloud-service provider apparatus 10 be given from a cloud-service provider apparatus 10 to the relay apparatus 40, a mechanism is provided in which the cloud-service provider apparatus 10 is accessed from the image processing apparatus 30 via the relay apparatus 40.

A password used to access a cloud-service provider apparatus 10 is confidential information of a user of the cloud-service provider apparatus 10. According to the exemplary embodiment, a mechanism is provided in which such confidential information is not registered in the relay apparatus 40, and in which an image processing apparatus 30 accesses a cloud-service provider apparatus 10 via the relay apparatus 40.

Modified Embodiments

The above-described exemplary embodiment is an example of the present invention, and may be modified as described below. The modified embodiments described below may be combined with each other.

An access token described in the above-described exemplary embodiment may include an expiration date. For example, in the case where the expiration date of an access token has passed, when the relay apparatus 40 uses the access token to access the cloud-service provider apparatus 10*a* in step S34 in FIG. 7 or step S43 or S48 in FIG. 12, the cloud-service provider apparatus 10*a* does not accept the access. In this case, the relay apparatus 40 receives an error reply indicating that the access fails. Receiving this error reply, the relay apparatus 40 deletes the access token which was used in the access to the cloud-service provider apparatus 10*a*, from the user database 44. The relay apparatus 40 transfers this error to the image processing apparatus 30. Receiving the error from the relay apparatus 40, the image processing apparatus 30 acquires a new access token by performing the processes in steps S18 to S26 in FIG. 6, and registers the new access token in the relay apparatus 40. Thus, after a new access token is registered in the relay apparatus 40, the image processing apparatus 30 performs the processes in FIG. 7 or FIG. 12 again.

In the above-described exemplary embodiment, the image processing apparatus 30 performs a process of registering an access token in the relay apparatus 40. Alternatively, a terminal different from the image processing apparatus 30 may perform the registration process. Such a terminal may be, for example, a personal computer (PC), a tablet PC, or a cellular phone.

In the above-described exemplary embodiment, before the process in step S24 in FIG. 6, a confirmation screen for checking whether or not the access token is to be registered in the relay apparatus 40 may be displayed on the display unit 34. In this case, when the registration of the access token is permitted in the confirmation screen through an operation of a user, the request unit 133 performs the process in step S24. When the registration of the access token is not permitted, the request unit 133 does not perform the processes in step S24 and its subsequent steps.

In the above-described exemplary embodiment, OCR is performed in step S33 in FIG. 7. However, it may be unnecessary to perform OCR. For example, when text data is received from the image processing apparatus 30 or OCR need not be performed, OCR may be unnecessary.

A user name and a password described in the above-described exemplary embodiment are an example of user identification information for identifying a user of an image processing apparatus 30. The user identification information may be an ID which is constituted by, for example, numbers and symbols and which is assigned to a user, or biological information of a user, such as a fingerprint or a vein.

An access token described in the above-described exemplary embodiment is an example of permission information indicating that access to a cloud-service provider apparatus 10 is permitted. The permission information is not limited to the exemplary information described in the exemplary embodiment. For example, the permission information may be constituted by, for example, two or more pieces of information. A token described in the above-described exemplary embodiment is an example of information indicating that a user is certified. This information is not limited to the exemplary information described in the exemplary embodiment.

The transmission of a token acquisition request described in the above-described exemplary embodiment is an example of a user authentication request. Thus, the user authentication request may be submitted by transmitting a token acquisition request including a user ID and a password or by transmitting other information.

The configuration of the communication system 1 is not limited to that described in the above-described exemplary embodiment. For example, the number of apparatuses constituting the communication system 1 may be different from that in the exemplary embodiment. The cloud-service provider apparatus 10 may have the function of a token issuing apparatus 20. In this case, a token issuing apparatus 20 need not be separately provided. The communication system 1 may include only the image processing apparatus 30 and the relay apparatus 40.

The image processing apparatus 30 described in the above-described exemplary embodiment is an example of a client apparatus which receives service from a cloud-service provider apparatus 10. The client apparatus may be, for example, a personal computer, a tablet PC, or a cellular phone.

A token issuing apparatus 20 described in the above-described exemplary embodiment is an example of an issuing apparatus which issues information indicating that a user is certified. An issuing apparatus may be any apparatus as long as the apparatus authenticates a user and issues information indicating that the user is certified. A cloud-service provider apparatus 10 described in the above-described exemplary embodiment is an example of a service provider apparatus which provides service for a client apparatus. The service provider apparatus is not necessarily an apparatus which provides a cloud service.

Programs executed in the image processing apparatus 30 and the relay apparatus 40 may be downloaded via a communication line such as the Internet. The programs may be provided in such a manner that a computer-readable recording medium, such as a magnetic recording medium (e.g., a magnetic tape or a magnetic disk), an optical recording medium (e.g., an optical disk), a magneto-optical recording medium, or a semiconductor memory, stores the programs.

In the above-described exemplary embodiment, the image processing apparatus 30 first requests the relay apparatus 40 to register a user name (an example of user identification information) and an access token (an example of permission information), and then submits an access request in step S31 in FIG. 7. Alternatively, the registration request and the access request may be submitted in the same process. For example, the relay apparatus 40 may transmit a user name and an access token to the relay apparatus 40 in step S24 in FIG. 6 so as to submit a request to access a cloud-service provider apparatus 10.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication system comprising:
a client apparatus; and
a relay apparatus,
wherein the client apparatus includes
a first processor;
an acquisition unit configured to use the first processor to transmit a user token to a service provider apparatus and acquire an access token from the service provider apparatus, the user token indicating user authentication and the access token indicating permission to access the service provider apparatus; and
a request unit configured to use the first processor to transmit the access token acquired by the acquisition unit and a first user identification information which has been input, to the relay apparatus so as to request access to the service provider apparatus, and
wherein the relay apparatus includes
a second processor;
an authenticating unit configured to use the second processor to authenticate by using a second user identification information which is different from the first user identification information;
a storage controller configured to use the second processor to, in condition of being in authentication success for the second user identification information by the authenticating unit, store the access token and the first user identification information which are received from the client apparatus, in a storage unit in such a manner that the access token and the first user identification information are associated with each other; and
an access unit configured to use the second processor to access, when receiving a request to access to the service provider apparatus from the client apparatus in condition of being in authentication success for the second user identification information by the authenticating unit, the service provider apparatus by using the access token stored in the storage unit.

2. The communication system according to claim 1,
wherein the request unit is configured to transmit data to be stored in the service provider apparatus to the relay apparatus, and
wherein the access unit is configured to request the service provider apparatus to store the data received from the client apparatus.

3. The communication system according to claim 1,
wherein the request unit is configured to transmit data identification information for identifying data stored in the service provider apparatus to the relay apparatus,
wherein the access unit is configured to acquire the data identified with the data identification information received from the client apparatus, from the service provider apparatus, and
wherein the relay apparatus further includes a transfer unit that is configured to transfer the data acquired by the access unit to the client apparatus.

4. The communication system according to claim 2,
wherein the request unit is configured to transmit data identification information for identifying the data stored in the service provider apparatus to the relay apparatus,
wherein the access unit is configured to acquire the data identified with the data identification information received from the client apparatus, from the service provider apparatus, and
wherein the relay apparatus further includes a transfer unit that is configured to use the second processor to transfer the data acquired by the access unit to the client apparatus.

5. A method comprising:
transmitting, by a client apparatus using a first processor, a user token to a service provider apparatus and acquiring an access token from the service provider apparatus, the user token indicating user authentication and the access token indicating permission to access the service provider apparatus;
transmitting, by the client apparatus, the acquired access token and a first user identification information which has been input, to a relay apparatus so as to request access to the service provider apparatus;
authenticating, by the relay apparatus using a second processor, by using a second user identification information which is different from the first user identification information;
in condition of being in authentication success for the second user identification information, storing, by the relay apparatus, the access token and the first user identification information which are received from the client apparatus, in such a manner that the access token and the first user identification information are associated with each other; and
when receiving a request to access to the service provider apparatus from the client apparatus in condition of being in authentication success for the second user identification information, the relay apparatus accessing the service provider apparatus by using the stored access token.

6. A non-transitory computer-readable medium storing a program causing a computer to execute a process comprising:
transmitting, by a client apparatus, a user token to a service provider apparatus and acquiring an access token from the service provider apparatus, the user token indicating user authentication and the access token indicating permission to access the service provider apparatus;
transmitting, by the client apparatus, the acquired access token and a first user identification information which has been input, to a relay apparatus so as to request access to the service provider apparatus;
authenticating, by the relay apparatus, by using a second user identification information which is different from the first user identification information;
in condition of being in authentication success for the second user identification information, storing, by the relay apparatus, the access token and the first user identification information which are received from the client apparatus, in such a manner that the access token and the first user identification information are associated with each other; and when receiving a request to access to the service provider apparatus from the client apparatus in condition of being in authentication success for the second user identification information, the relay apparatus accessing the service provider apparatus by using the stored access token.

* * * * *